(12) United States Patent
Mosley

(10) Patent No.: US 9,777,457 B2
(45) Date of Patent: Oct. 3, 2017

(54) WATER SERVICE MONITOR ASSEMBLY

(71) Applicant: Harold Edmund Mosley, Toledo, OH (US)

(72) Inventor: Harold Edmund Mosley, Toledo, OH (US)

( * ) Notice: Subject to any disclaimer, the term of this patent is extended or adjusted under 35 U.S.C. 154(b) by 34 days.

(21) Appl. No.: 14/477,262

(22) Filed: Sep. 4, 2014

(65) Prior Publication Data

US 2015/0059888 A1 Mar. 5, 2015

Related U.S. Application Data

(60) Provisional application No. 61/873,525, filed on Sep. 4, 2013.

(51) Int. Cl.
| | |
|---|---|
| *E02D 29/14* | (2006.01) |
| *G08B 13/08* | (2006.01) |
| *E03B 9/10* | (2006.01) |
| *E03B 7/09* | (2006.01) |
| *E03B 7/07* | (2006.01) |
| *G01F 1/05* | (2006.01) |
| *G08B 13/14* | (2006.01) |
| *G01F 15/06* | (2006.01) |
| *G01F 15/00* | (2006.01) |

(52) U.S. Cl.
CPC ......... *E02D 29/1481* (2013.01); *E02D 29/14* (2013.01); *E03B 7/072* (2013.01); *E03B 7/095* (2013.01); *E03B 9/10* (2013.01); *G01F 1/05* (2013.01); *G01F 15/007* (2013.01); *G01F 15/063* (2013.01); *G08B 13/08* (2013.01); *G08B 13/149* (2013.01); *Y10T 137/6995* (2015.04); *Y10T 137/7021* (2015.04); *Y10T 137/7043* (2015.04); *Y10T 137/8158* (2015.04)

(58) Field of Classification Search
CPC ................. G01F 15/063; G01F 15/005; Y10T 137/7021; Y10T 137/7043; Y10T 137/6995; Y10T 137/7017; G08B 13/149
See application file for complete search history.

(56) References Cited

U.S. PATENT DOCUMENTS

| | | | | |
|---|---|---|---|---|
| 5,236,049 A | * | 8/1993 | Asselin .................. | A62C 37/44 169/17 |
| 5,327,925 A | * | 7/1994 | Ortel ......................... | E03B 9/10 137/15.08 |
| 5,760,706 A | * | 6/1998 | Kiss ........................ | H04B 7/24 340/10.34 |
| 5,840,128 A | * | 11/1998 | Imig ...................... | B08B 9/0436 134/22.11 |
| 7,784,490 B1 | * | 8/2010 | Stewart ................... | B63B 13/02 137/554 |
| 2003/0107485 A1 | * | 6/2003 | Zoratti ................... | A62C 31/28 340/568.1 |
| 2010/0019912 A1 | * | 1/2010 | Wander ............... | E02D 29/1427 340/632 |
| 2010/0156632 A1 | * | 6/2010 | Hyland .................. | G08B 25/08 340/540 |

(Continued)

*Primary Examiner* — Atif Chaudry
(74) *Attorney, Agent, or Firm* — MacMillan, Sobanski & Todd, LLC

(57) ABSTRACT

A water service supply assembly includes a water supply line with a stop valve. A lid is supported relative to the stop valve. A first switch is adapted to detect movement of the lid and a second switch is adapted to detect if a body is moved relative to the stop valve.

20 Claims, 4 Drawing Sheets

(56) References Cited

U.S. PATENT DOCUMENTS

| | | | |
|---|---|---|---|
| 2011/0148647 A1* | 6/2011 | Miller, II | G08B 13/1672 340/686.1 |
| 2011/0190947 A1* | 8/2011 | Savelle, Jr. | G05D 11/02 700/284 |

* cited by examiner

WATER SERVICE MONITOR ASSEMBLY

CROSS-REFERENCE TO RELATED APPLICATIONS

This application claims the benefit of U.S. Provisional Application No. 61/873,525, filed Sep. 4, 2013, the disclosure of which is incorporated herein by reference.

BACKGROUND OF THE INVENTION

This invention relates in general to a tamper detection system. More specifically, this invention relates to a system to detect tampering with a water supply valve.

In many locations, water is supplied to residential, commercial, and industrial properties from a source such as a water treatment plant. The water source is typically operated by a public utility company that provides water to customers for a fee. The water is commonly distributed from the source throughout an area such as a municipality using a network of water mains.

A supply line may be connected to one of the water mains in order to provide water to a property. A flow meter is typically included on the supply line so that the amount of water flow to the property may be measured. This allows the property to be billed for the water used. A stop valve is also typically included on the supply line so that the water flow through the supply line may be stopped. The water flow may be stopped when the property is unoccupied, or when the owner of the property is delinquent in paying a bill for the supplied water.

The stop valve is typically located in a convenient position to allow an employee of the public utility company to stop the water supply to the property. At a residential property, the stop valve is often included in a curb box assembly. The curb box assembly includes an underground box that contains the stop valve. The underground box may be several feet below the ground surface. A conduit connected to the box extends to the ground surface to provide access to the box. The conduit is typically four to six inches in diameter, and four to five feet long. The conduit is typically capped with a bolted-on lid. The employee may remove the lid from the conduit and use a tool, commonly referred to as a curb key, to manually open and close the stop valve.

In some situations, the public utility company will stop the water supply to a property but the owner or a tenant of the property will open the stop valve in order to turn the water supply to the property back on.

To help prevent this from happening, public utility companies have attempted various procedures to deter or prevent someone from unauthorized access to the stop valve. A plug may be inserted in the conduit which rests on top of the stop valve and helps block access to the stop valve. One known type of plug is a simple wooden dowel having a metal weighted end. Due to the narrowness of the conduit relative to its length, it is difficult to remove the plug from the bottom of the conduit. Although the plug helps deter water theft by blocking access to the stop valve, determined individuals have been known to remove the plug and operate the stop valve without the permission of the public utility company. The public utility companies often do not have the resources to monitor and determine when the stop valve has been tampered with until a meter reading indicates that the water is being supplied to the property. It is relatively expensive for the public utility companies to send personnel at random intervals to monitor tampering of the stop valves. It is desirable to have an improved system to indentify when a stop valve has been improperly tampered with.

SUMMARY OF THE INVENTION

This invention relates to a water service supply assembly. The water service supply assembly includes a water supply line with a stop valve. A lid is supported relative to the stop valve. A first switch is adapted to detect movement of the lid and a second switch is adapted to detect if a body is moved relative to the stop valve.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
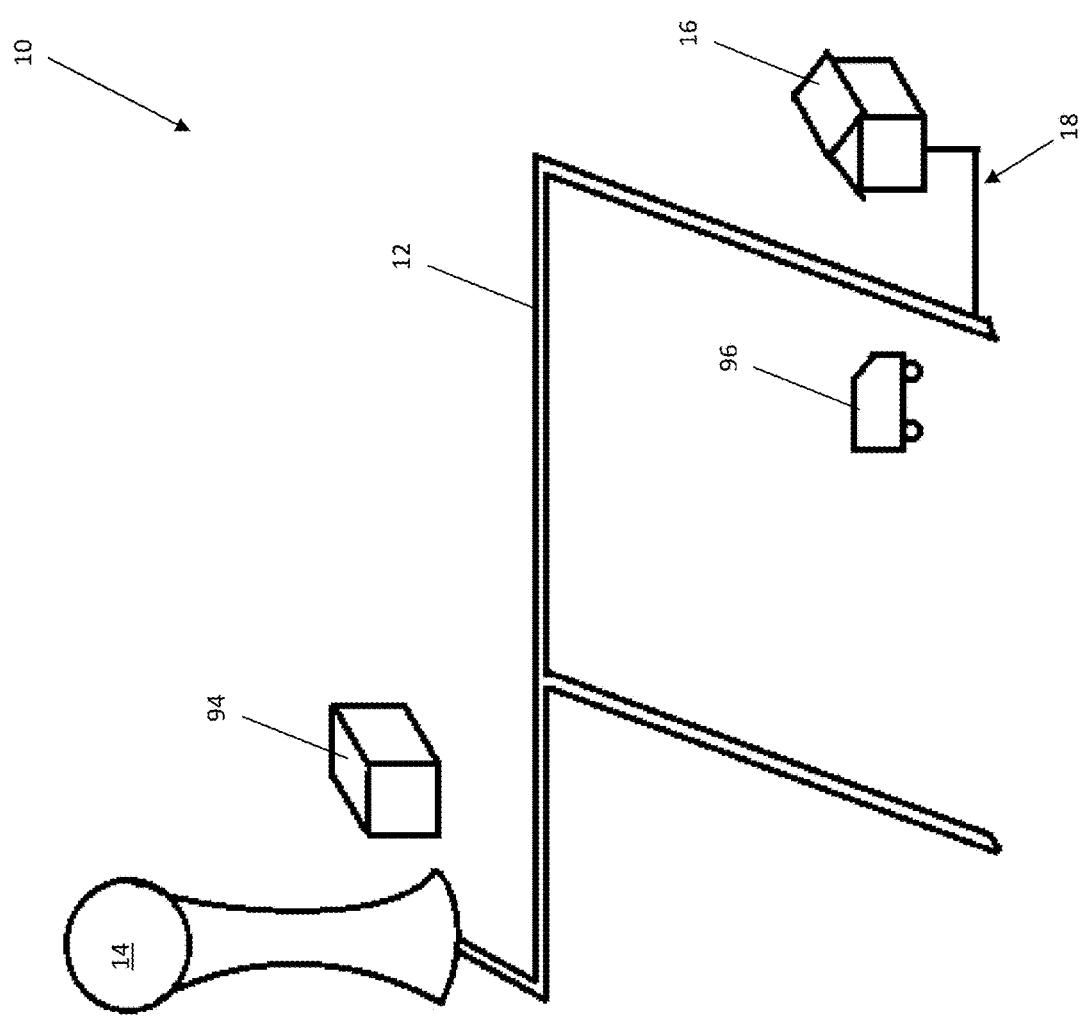
FIG. 1 is a schematic view of a water distribution system, including a network of water mains.

Referring now to the drawings, there is illustrated in FIG. 1 a schematic illustration of a water distribution system, indicated generally at 10. The water distribution system 10 includes a network of water mains 12 that distribute water provided from a water source 14. The illustrated water source 14 is operated by a utility company, but may be operated by any desired individual or organization. The water source 14 may be a water treatment plant, a reservoir, or any other desired source of water. The water distribution system 10 provides water to consumers such as the residential property 16.

Figure 2:
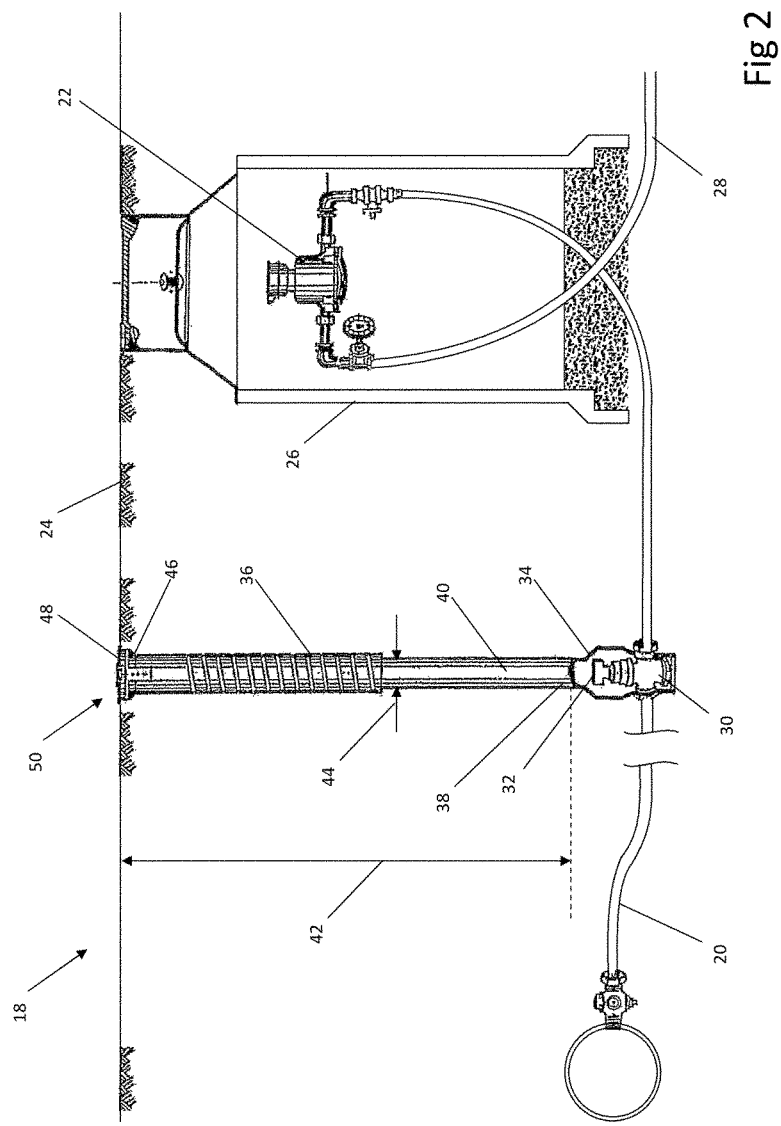
FIG. 2 is a side, schematic view of a water service supply assembly that provides water from one of the water mains to a property.

Referring to FIG. 2, there is shown a schematic, side view of a water service supply assembly, indicated generally at 18. The water service supply assembly 18 allows water to be transferred from the water main 12 to the property 16. The water service supply assembly 18 includes a supply line 20 that provides water flow from the water main 12 to a water meter 22. The illustrated water meter 22 is located below the surface of the ground 24 in a concrete enclosure 26. However, the water meter 16 may be mounted above the ground surface 24 or within or on a building (not shown). A house line 28 is connected to the water meter 22 and provides water to the property 16.

A stop valve 30 is connected to the supply line 20 and may be used to stop water flow from the water main 12 to the water meter 22. The illustrated stop valve 30 is a ball valve, but any desired type valve may be used as the stop valve 30. A knob 32 may be turned to switch the stop valve 30 between an open position in which water is able to flow from the water main 12 to the water meter 22, and a closed position in which water is unable to flow from the water main 12 to the water meter 22. An employee of the utility company may move the stop valve 30 to the closed position in order to stop water supply to the property 16.

The stop valve 30 is located below the ground surface 24 and is located in a protective housing 34. In order to allow the employee to reach the knob 32, a conduit 36 is connected at a lower end 38 to the housing 34 and extends to the ground surface 24. The illustrated conduit 36 is situated in a substantially vertical orientation, but the conduit 36 may have any other desired orientation. The conduit 36 defines an internal space 40. The illustrated internal space 40 has a height 42 of approximately five feet and has a circular cross-section with a width 44 of approximately three inches. However, the internal space 40 may have any desired shape and dimensions. The conduit 36 is capped at an upper end 46 with a lid 48 that is bolted to the conduit 36. The illustrated lid 48 is generally flush with the ground surface 24, although the lid 48 may be situated above or below the ground surface 24, if desired. The lid 48 helps prevent debris from getting into the internal space 40.

Figure 3:
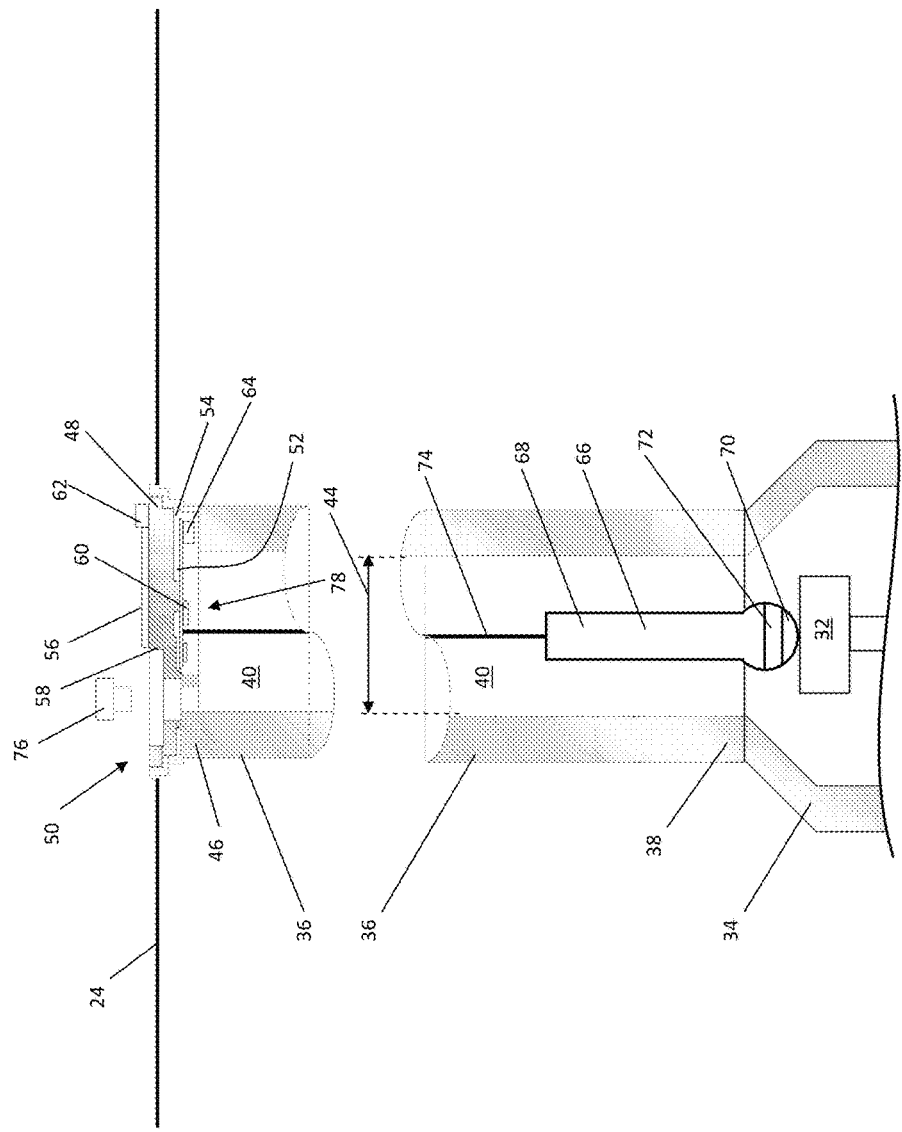
FIG. 3 is a side view of a lower end and an upper end of a conduit that provides access to a stop valve of the water service supply assembly.

Referring now to FIG. 3, a side view of the lower end 38 and the upper end 46 of the conduit 36 are shown. The water service assembly 18 includes a monitor assembly, indicated generally at 50. The monitor assembly 50 helps to provide the utility company with notification that the stop valve 30 has been tampered with. The monitor assembly 50 may be installed on a property 16 where a tenant is believed to have tampered with the stop valve 30. Alternatively, the monitor assembly 50 may be installed on all properties connected to the water distribution system 10, if desired.

The monitor assembly 50 includes a circuit board 52 attached to an underside 54 of the lid 48. It should be appreciated that the circuit board 52 is located within the internal space 40 when the lid 48 is attached to the conduit 36, as shown in FIG. 3. The illustrated monitor assembly 50 includes an optional solar cell 56 that is attached to an upper side 58 of the lid 48. The solar cell 56 is connected to charge a battery 60 to provide power for the monitor assembly 50. The illustrated monitor assembly 50 also includes an optional external charge port 62 that allows an external device (not shown) to be used to recharge the battery 60. It should be appreciated that the lid 48 may also be removed from the conduit 36 in order to replace or recharge the battery 60.

The monitor assembly 50 includes a first switch, a cap switch 64 that is adapted to detect movement of the lid 48. The cap switch 64 detects if the lid 48 is removed from the conduit 36. The illustrated cap switch 64 is a Hall effect sensor but any desired type of sensor that detects when the lid 48 is removed from the conduit 36, or detects when the lid 48 has been moved may be used as the cap switch 64. The monitor assembly 50 also includes a second switch, a valve switch 66 that detects if the stop valve 30 is tampered with. The illustrated valve switch 66 includes a body 68 and a pressure sensor 72 that rests on the knob 32 of the stop valve 30. The valve switch 66 is connected to the circuit board 52 by a wire 74. The wire 74 allows electric communication between the circuit board 52 and the valve switch 66, and also provides a way for the valve switch 66 to be lowered into and raised from the internal space 40. The pressure sensor 72 detects the weight of the body 68. If the valve switch 66 is lifted off the knob 32, the weight of the body 68 is no longer supported by the pressure sensor 72. It should be appreciated that in normal operation of the stop valve 30, the valve switch 66 is removed from the internal space 40 so that a tool (not shown) may be used to rotate the knob 32. Therefore, removal of the valve switch 66 from the knob 32 is an indication that someone is attempting to tamper with the stop valve 30. It should be appreciated that while one embodiment of the valve switch 66 has been described, any desired type of sensor that detects when the knob 32 is being tampered with may be used as the valve switch 64. The illustrated valve switch 66 includes an optional reinforced head 70. The reinforced head 70 is made of steel and acts to prevent the valve switch 66 from being deformed against the knob 32. It should be appreciated that if the valve switch 66 is made of a relatively soft material, it may be possible to apply sufficient force to deform the valve switch 66 around the knob 32. The reinforced head 70 helps to avoid this possibility.

The illustrated monitor assembly 50 is installed by inserting the valve switch 66 into the internal space 40 of the conduit 36 and lowering it onto the knob 32. The lid 48 is then bolted onto the conduit using a bolt 76. Although the illustrated monitor assembly 50 has been described as including both the cap switch 64 and the valve switch 66, it should be appreciated that the monitor assembly 50 may include only one of the switches 64 and 66, if desired.

Figure 4:
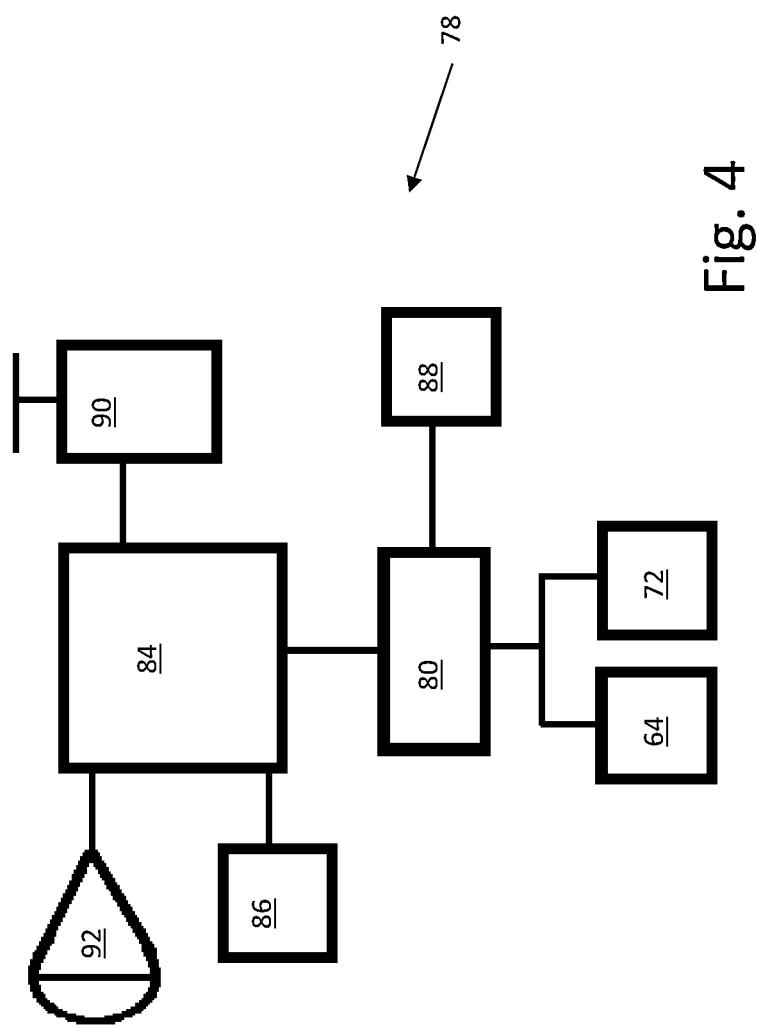
FIG. 4 is circuit diagram for a monitor assembly of the water service supply assembly.

The circuit board 52 includes a plurality of components, indicated generally at 78, and the operation of the monitor assembly 50 will be described in reference to the circuit diagram shown in FIG. 4. It should be appreciated that the circuit diagram illustrated in FIG. 4 is only one embodiment of the monitor assembly 50, and the circuitry of the monitor assembly 50 may differ from that shown, if desired.

The monitor assembly 50 includes a low power latch 80. If either the cap switch 64 or the valve switch 66 is activated (in the illustrated embodiment, by removing the lid 48 from the conduit 36 or lifting the valve switch 66 off the knob 32, respectively), then the lower power latch 80 turns on a control unit 84. The monitor assembly 50 also includes an optional self-wake circuit 86 that activates the control unit 84 at intervals. In the illustrated embodiment, the self-wake circuit 86 activates the control unit 84 approximately once every two weeks. However, the self-wake circuit 86 may activate the control unit 84 at any desired frequency or schedule. When activated, the control unit 84 checks the status of the cap switch 64, the valve switch 66, and a disable circuit 88 and will take action depending on the statuses, as described in the following paragraphs. It should be appreciated that the actions described herein are only descriptive of the illustrated embodiment, and the monitor assembly 50 may take other desired actions.

If the disable circuit 88 is active, then the control unit 84 will take no further action. The disable circuit 88 being active indicates that the monitor assembly 50 is not intended to be operating.

If the cap switch 64, the valve switch 66 and the disable circuit 88 are not active, then the self-wake circuit 86 is assumed to have activated the control unit 84 and the control unit 84 will generate a check-in message. The control unit 84 will activate a communication module 90. The illustrated communication module 90 is a cellular radio and the control unit 84 sends a check-in message containing information identifying the property 16 and the amount of charge in the battery 60. In the illustrated embodiment, the check-in message is a text message that is sent to the utility company. The check-in message helps to identify that the monitor assembly 50 is operating without requiring the employee to physically access or inspect the monitor assembly 50. The check-in message and may contain any other desired information. It should be appreciated that the communication module 90 may be any desired communications system and may send a message using any desired format.

If the cap switch 64 is active, then the lid 48 has been removed from the conduit 36 and the control unit 84 will generate a warning message. The control unit 84 will activate the communication module 90 and send a warning message containing information identifying the property 16 and that the cap switch 64 was activated. The warning message alerts the utility company that the water service supply assembly 18 is possibly being tampered with. The control unit 84 will also activate an optional audible alarm 92 for a period of time. The audible alarm 92 may indicate to someone otherwise unaware that they should not tamper with the water service supply assembly 18.

If the valve switch 66 is active, then the valve switch 66 has been lifted from the knob 32 and the control unit 84 will generate an alarm message. The control unit 84 will activate the communication module 90 and send an alarm message containing information identifying the property 16 and that the valve switch 64 was activated. The alarm message alerts the utility company that the water service supply assembly 18 is possibly being tampered with. The control unit 84 will also activate the audible alarm 92 for a period of time. The audible alarm 92 may make a different sound or pattern of sounds in response to the valve switch 66 being activated as compared to the cap switch being activated, if desired.

In the illustrated monitor assembly 50, the control unit 84 will shut off the audible alarm after two minutes and turn off. However, the control unit 84 may operate the audible alarm 92 differently, or may send additional messages, if desired.

Referring back to FIG. 1, the monitor assembly 50 provides notification to the utility company that the water service supply assembly 18 at the property 16 has been tampered with (or potentially has been tampered with) without the employee having to go to the property 16. The messages sent by the monitor assembly 50 may be remotely received at a station 92 and the decision to send an employee to inspect, replace, repair, or recharge the monitor assembly 50 may be made based on the messages. Additionally, while the illustrated embodiment is described as including a cellular radio as the communication module 90, it should be appreciated that the communication module 90 may be any other desired type of communication system. The communication module 90 may, for example, use a relatively short range communication system that transmits signals intended to be detected by a local receiver, or by a mobile receiver located on a vehicle 96 operated by the utility company.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A water service supply assembly monitor assembly comprising:
   a control unit mounted on a lid;
   a first switch adapted to detect movement of the lid; and
   a second switch adapted to detect movement of a stop valve connected between a water supply line and a water meter;
   wherein the control unit generates a first message when the first switch is activated and a second message when the second switch is activated, and
   wherein the second switch is configured to:
      detect pressure; or
      detect weight; or
      be lowered toward the stop valve by a wire suspended from the control unit.

2. The water service supply assembly monitor assembly of claim 1, wherein the second switch is adapted to detect movement of a body; wherein the body is separate from and resting on the stop valve.

3. The water service supply assembly monitor assembly of claim 1, wherein the second switch is adapted to detect pressure.

4. The water service supply assembly monitor assembly of claim 1, wherein the wire suspends the second switch from the lid, such that the second switch removably rests on the stop valve.

5. The water service supply assembly monitor assembly of claim 1, wherein the second switch can be raised away from the stop valve.

6. A water service supply assembly comprising:
   a water supply line that is connected through a stop valve to a water meter;
   a lid supported relative to the stop valve;
   a first switch adapted to detect movement of the lid;
   a second switch adapted to detect movement of the stop valve; and
   a control unit that generates a first message when the first switch detects movement of the lid and a second message when the second switch detects movement of the stop valve,
   wherein the second switch is configured to:
      detect pressure; or
      detect weight; or
      be lowered toward the stop valve by a wire suspended from the control unit.

7. The water service supply assembly of claim 6, wherein the stop valve is located in a housing, a conduit is connected at a first end to the housing, and the lid is attached to a second end of the conduit; wherein the first switch is adapted to detect movement of the lid relative to the conduit.

8. The water service supply assembly of claim 6, wherein the stop valve is located in a housing, a conduit is connected at a first end to the housing, and the lid is attached to a second end of the conduit; wherein the second switch is adapted to detect movement of the stop valve.

9. The water service supply assembly of claim 6, wherein the stop valve is located in a housing, a conduit is connected at a first end to the housing, and the lid is attached to a second end of the conduit; wherein the second switch is adapted to detect movement of a body supported on the stop valve relative to the stop valve.

10. The water service supply assembly of claim 6, wherein a conduit is connected at a first end to a housing, the lid is attached to a second end of the conduit, and the conduit defines an internal space; wherein the first switch and the second switch are located in the internal space.

11. The water service supply assembly of claim 6, wherein the control unit includes a communication module that transmits the first message and the second message.

12. The water service supply assembly of claim 11, wherein the control unit includes a self-wake circuit; wherein the control unit transmits a third message when the self-wake circuit is activated.

13. A water service supply assembly monitor assembly comprising:
   a control unit mounted on a lid;
   a switch adapted to detect movement of a stop valve;
   a wire extending from the control unit to the switch; and
   wherein the switch is configured to be raised away from the stop valve.

14. The water service supply assembly monitor assembly of claim 13, wherein the switch can be lowered towards the stop valve.

15. The water service supply assembly monitor assembly of claim 13, wherein the switch comprises:
   a body; and
   a sensor that detects the weight of the body.

16. The water service supply assembly monitor assembly of claim 15, wherein the sensor is protected by a reinforced head.

17. The water service supply assembly monitor assembly of claim 13, wherein the switch comprises:
   a body; wherein the body is suspended by the wire.

18. The water service supply assembly monitor assembly of claim 13, wherein the switch comprises:
   a body that prevents access to the stop valve.

19. The water service supply assembly monitor assembly of claim 13, wherein the control unit generates a message when the switch is activated.

20. The water service supply assembly monitor assembly of claim 13, wherein the control unit includes a communication module that transmits a message.

* * * * *